United States Patent
Fu et al.

(10) Patent No.: US 9,461,554 B2
(45) Date of Patent: Oct. 4, 2016

(54) HYBRID CONVERTER USING A RESONANT STAGE AND A NON-ISOLATED STAGE

(71) Applicant: Futurewei Technologies, Inc., Plano, TX (US)

(72) Inventors: Dianbo Fu, Plano, TX (US); Liming Ye, Frisco, TX (US); Heping Dai, Plano, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 44 days.

(21) Appl. No.: 14/502,196

(22) Filed: Sep. 30, 2014

(65) Prior Publication Data

US 2016/0094136 A1  Mar. 31, 2016

(51) Int. Cl.
  *H02M 3/158* (2006.01)
  *H02M 3/335* (2006.01)
  *H02M 1/00* (2006.01)

(52) U.S. Cl.
  CPC ....... *H02M 3/33584* (2013.01); *H02M 3/1582* (2013.01); *H02M 2001/007* (2013.01); *H02M 2001/0058* (2013.01)

(58) Field of Classification Search
  CPC ...................................................... H02M 1/42
  USPC ............................................. 323/266; 363/17
  See application file for complete search history.

(56) References Cited

U.S. PATENT DOCUMENTS

| 8,274,266 | B2 * | 9/2012 | Engelhardt | H02M 3/1582 323/259 |
| 8,467,199 | B2 * | 6/2013 | Lee | H02M 3/33584 363/21.02 |
| 8,681,513 | B2 * | 3/2014 | Reddy | H02M 7/217 323/266 |
| 9,041,372 | B2 * | 5/2015 | Xie | H02M 3/1582 307/11 |
| 2004/0090801 | A1 * | 5/2004 | Chen | H02M 3/33592 363/24 |
| 2012/0112657 | A1 * | 5/2012 | Van Der Veen | H02M 1/4225 315/291 |

OTHER PUBLICATIONS

Orietti, E. et al., "Analysis of Multi-Phase LLC Resonant Converters," Power Electronics Conference, Sep. 27, 2009-Oct. 1, 2009, pp. 464-471.

* cited by examiner

*Primary Examiner* — Jessica Han
*Assistant Examiner* — David A. Singh
(74) *Attorney, Agent, or Firm* — Futurewei Technologies, Inc.

(57) ABSTRACT

A converter comprises a non-isolated stage coupled to an input dc power source, wherein the non-isolated stage is configured to operate at a buck converter mode in response to a first input voltage and operate at a boost converter mode in response to a second input voltage, a resonant stage coupled between the non-isolated stage and a load, wherein the resonant stage is configured to operate at a resonant mode and a capacitor coupled between the non-isolated stage and the resonant stage.

19 Claims, 11 Drawing Sheets

HYBRID CONVERTER USING A RESONANT STAGE AND A NON-ISOLATED STAGE

TECHNICAL FIELD

The present invention relates to a power converter, and, in particular embodiments, to a hybrid resonant converter.

BACKGROUND

A telecommunication network power system usually includes an AC-DC stage converting the power from the AC utility line to a 48 V DC distribution bus and a DC-DC stage converting the 48 V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, LLC resonant converters and the like.

As technologies further advance, bus converters have been widely employed in the telecommunication industry. The bus voltages may be divided into three categories, a 12 V bus voltage converted from a 48 V input dc power supply, a 48 V bus voltage converted from a 380 V input dc power supply and a 12 V bus voltage converted from a 380 V input dc power supply. A bus converter not only converts the input voltage from a higher level to a lower level, but also provides isolation through a magnetic device such as transformers and/or the like.

The intermediate bus voltage such as 12 V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof. The downstream non-isolated power converters operate under a tight control loop so that fully regulated output voltages are fed into their respective loads.

SUMMARY OF THE INVENTION

These and other problems are generally solved or circumvented, and technical advantages are generally achieved, by preferred embodiments of the present invention which provide a system, apparatus and method for achieving a high efficiency and tightly regulated power converter.

In accordance with an embodiment, a converter comprises a non-isolated stage coupled to an input dc power source, wherein the non-isolated stage is configured to operate at a buck converter mode in response to a first input voltage and operate at a boost converter mode in response to a second input voltage, a resonant stage coupled between the non-isolated stage and a load, wherein the resonant stage is configured to operate at a resonant mode and a capacitor coupled between the non-isolated stage and the resonant stage.

In accordance with another embodiment, a system comprises a non-isolated stage coupled between an input dc power source and a capacitor, wherein the non-isolated stage is configured to operate at a buck converter mode when an input voltage from the input dc power source is higher than a voltage threshold and the non-isolated stage is configured to operate at a boost converter mode when the input voltage from the input dc power source is lower than the voltage threshold and a resonant stage coupled to the non-isolated stage, wherein the resonant stage is configured to operate at a resonant mode and the resonant stage has a first input terminal coupled to the capacitor and a second input terminal coupled to the input dc power source.

In accordance with yet another embodiment, a method comprises detecting an input voltage from a dc input source coupled to a hybrid resonant converter, wherein the hybrid resonant converter comprises a non-isolated stage coupled between an input dc power source and a capacitor, wherein the non-isolated stage is configured to operate at a PWM mode and a resonant stage coupled between the capacitor and a load, wherein the resonant stage is configured to operate at a resonant mode, configuring the non-isolated stage to operate at a buck converter mode in response to a first input voltage and configuring the non-isolated stage to operate at a boost converter mode in response to a second input voltage, wherein the first voltage is higher than the second voltage.

An advantage of a preferred embodiment of the present invention is a high efficiency power converter is based upon a hybrid power converter topology. Such a hybrid resonant converter topology is capable of achieve high efficiency as well as tight regulation. In particular, a resonant stage of the hybrid resonant converter topology may be implemented as an unregulated LLC resonant converter operating at a fixed switching. As a result, the LLC resonant converter may achieve high efficiency through zero voltage switching of the primary switches and zero voltage switching and/or zero current switching of the secondary switches. On the other hand, a non-isolated stage of the hybrid resonant converter topology is tightly regulated through adjusting the output voltage of the non-isolated stage. Furthermore, only a fraction of the total power of the power converter passes through both the non-isolated stage and the resonant stage. As a result, the power converter may achieve a better efficiency in comparison with conventional two-stage power converters.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a hybrid resonant converter comprising a first non-isolated stage and a second isolated stage. The invention may also be applied, however, to a variety of power converters. For example, the second isolated stage may be implemented as full bridge converters, half bridge converters, forward converters, flyback converters, any combinations thereof and/or the like. Hereinafter, various embodiments will be explained in detail with reference to the accompanying drawings.

Figure 1:
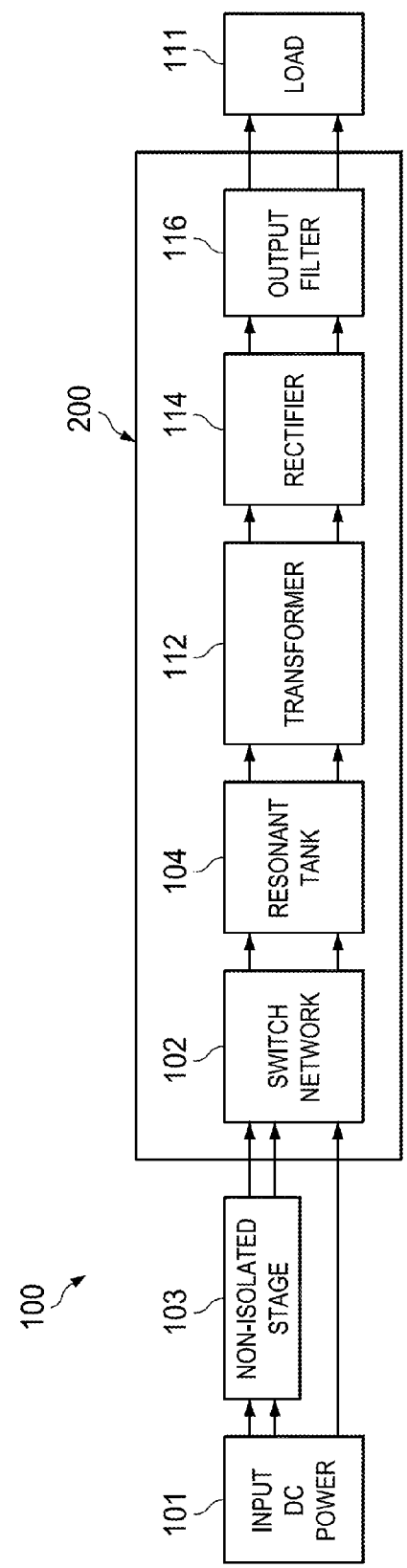
FIG. 1 illustrates a block diagram of a hybrid resonant converter in accordance with various embodiments of the present disclosure.

FIG. 1 illustrates a block diagram of a hybrid resonant converter in accordance with various embodiments of the present disclosure. The hybrid resonant converter 100 comprises a first stage 103 and a second stage 200. The first stage 103 is coupled between an input dc power source 101 and the second stage 200. The second stage 200 has at least one input terminal coupled to the input dc power source 101 as shown in FIG. 1.

In some embodiments, the first stage 103 may be implemented as a non-isolated converter. Throughout the description, the first stage 103 may be alternatively referred to as a non-isolated stage 103.

In some embodiments, the second stage 200 may be implemented as a variety of power converters such as full bridge converters, half bridge converters, forward converters, flyback converters, any combinations thereof and/or the like. In some embodiments, the second stage 200 may be a resonant stage such as an inductor-inductor-capacitor (LLC) resonant converter and/or the like. Throughout the description, the second stage 200 may be alternatively referred to as an LLC resonant converter 200 or a resonant stage 200.

In some embodiments, the non-isolated stage 103 is a non-isolated and regulated power converter. The resonant stage 200 is an unregulated power converter. More particularly, the non-isolated stage 103 is a four-switch buck-boost power converter. The resonant stage 200 is an isolated and unregulated LLC resonant converter operating at a fixed switching frequency. For example, the LLC resonant converter 200 may operate at a switching frequency close to its resonant frequency. As such, the LLC resonant converter 200 may achieve high efficiency through zero voltage switching of the primary switches and zero voltage switching and/or zero current switching of the secondary switches.

It should be noted that the hybrid resonant converter 100 is fully regulated because the non-isolated stage 103 is a tightly regulated power converter. The control of the non-isolated stage 103 includes two operating modes. When an input voltage from the input dc power source 101 is higher than a voltage threshold, the non-isolated stage 103 is configured to operate at a buck converter mode. During the buck converter mode, the regulation of the output voltage of the non-isolated stage 103 is achieved through PWM control. On the other hand, when the input voltage from the input dc power source 101 is lower than the voltage threshold, the non-isolated stage 103 is configured to operate at a boost converter mode. During the boost converter mode, the regulation of the output voltage of the non-isolated stage 103 is achieved through PWM control. The voltage threshold may vary depending on different design needs and applications. The detailed schematic diagram of the non-isolated stage 103 will be described below with respect to FIG. 2.

It should further be noted the power delivered from the input dc power source 101 is partially through the non-isolated stage 103 as shown in FIG. 1. In fact, the majority of the power may be delivered to the resonant stage 200 directly. Only a fraction of the power form the input dc power source 101 passes through both the non-isolated stage 103 and the resonant stage 200. As a result, the hybrid resonant converter 100 is not a conventional two-stage power converter. In fact, the hybrid resonant converter 100 is a one-and-half stage power converter. Throughout the description, the hybrid resonant converter 100 may be alternatively referred to as a one-and-half stage power converter.

One advantageous feature of the system configuration described above is the hybrid resonant converter 100 is capable of achieve high efficiency as well as tight regulation. In particular, the resonant stage 200 may be implemented as an unregulated LLC resonant converter operating at a fixed switching (e.g., the resonant frequency of the LLC resonant converter). As a result, the LLC resonant converter may achieve high efficiency through zero voltage switching of the primary switches and zero voltage switching and/or zero current switching of the secondary switches. On the other hand, the hybrid resonant converter 100 is tightly regulated through adjusting the output voltage of the non-isolated stage 103.

Furthermore, only a fraction of the total power of the hybrid resonant converter 100 passes through both the non-isolated stage 103 and the resonant stage 200. As a result, the hybrid resonant converter 100 may achieve a better efficiency in comparison with conventional two-stage power converters (e.g., a non-isolated stage and an isolated stage connected in cascade between an input and an output of a power converter).

The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the LLC resonant converter 200. Alternatively, the load 111 may refer to downstream converters coupled to the output of the LLC resonant converter 200.

The LLC resonant converter 200 may comprise a switch network 102, a resonant tank 104, a transformer 112, a rectifier 114 and an output filter 116. As shown in FIG. 1, the switch network 102, the resonant tank 104, the transformer 112, the rectifier 114 and the output filter 116 are coupled to each other and connected in cascade between the input and the output of the LLC resonant converter 200.

The switch network 102 may comprise primary side switches of a full bridge resonant converter according to some embodiments. Alternatively, the switch network 102 may be of the primary side switches of other bridge converters such as a half-bridge resonant converter, a push-pull resonant converter and the like. The detailed configuration of the switch network 102 will be described below with respect to FIG. 2.

The resonant tank 104 may be implemented in a variety of ways. For example, the main resonant tank comprises a series resonant inductor, a parallel resonant inductor and a series resonant capacitor (shown in FIG. 2 respectively).

The series resonant inductor and the parallel resonant inductor may be implemented as external inductors. A person skilled in the art will recognize that there may be many variation, alternatives and modifications. For example, the series resonant inductor may be implemented as a leakage inductance of the transformer 112.

In sum, the resonant tank 104 includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank 104, the resonant tank 104 helps to achieve zero voltage switching for the primary side switching elements and zero current switching for the secondary side switching elements.

The LLC resonant converter 200 may further comprise a transformer 112, a rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer 112 is of a single secondary winding, the rectifier 114 may be a full-wave rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The output filter 116 is used to attenuate the switching ripple of the LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
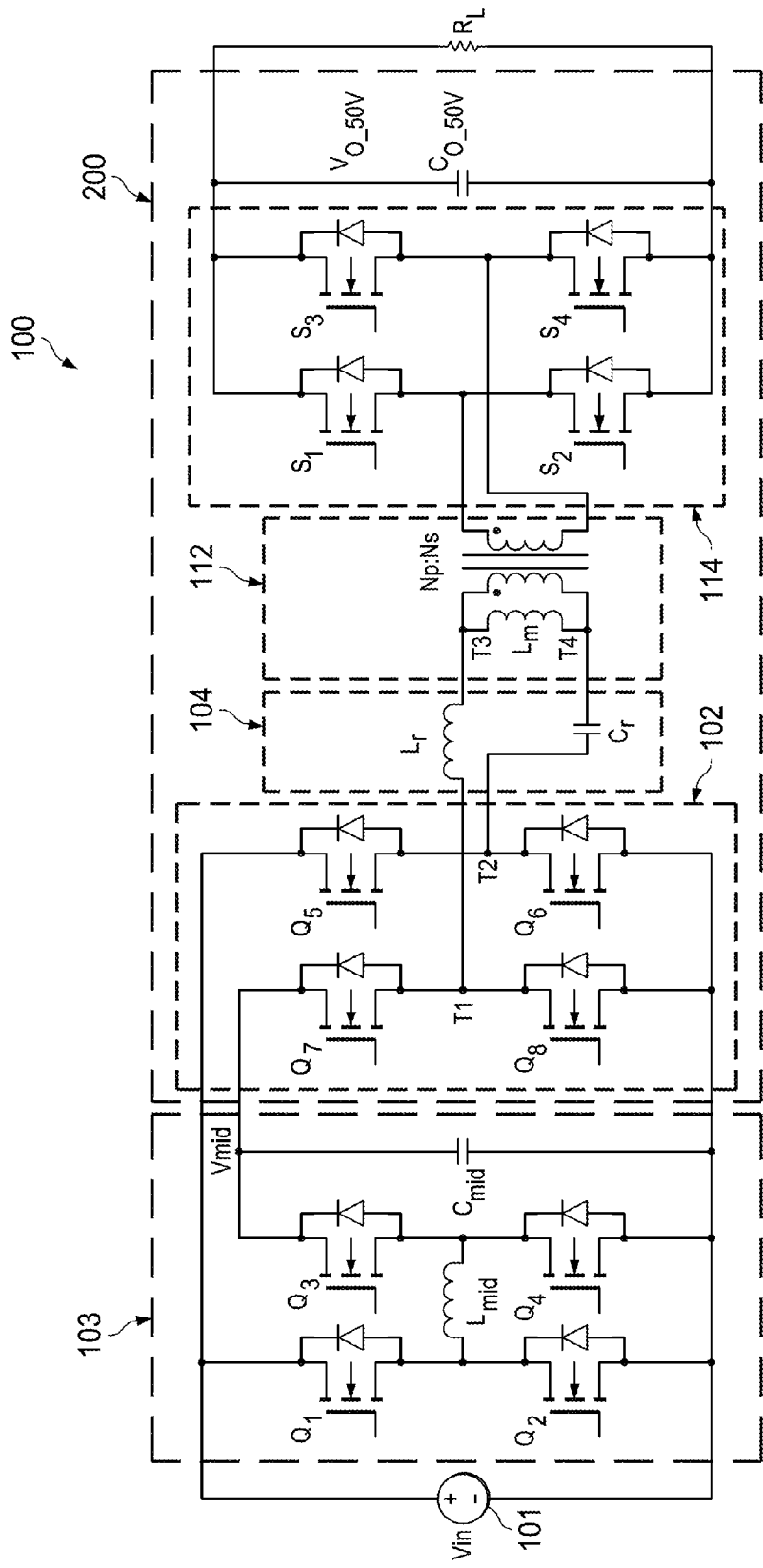
FIG. 2 illustrates a schematic diagram of the hybrid resonant converter shown in FIG. 1 in accordance with various embodiments of the present disclosure.

FIG. 2 illustrates a schematic diagram of the hybrid resonant converter shown in FIG. 1 in accordance with various embodiments of the present disclosure. The non-isolated stage 103 comprises four switching elements, namely Q1, Q2, Q3 and Q4. The non-isolated stage 103 further comprises an inductor Lmid and an output capacitor Cmid. As shown in FIG. 2, switching elements Q1 and Q2 are connected in series and further coupled between the positive terminal and negative terminal of the input dc power source 101. Switching elements Q3 and Q4 are connected in series and further coupled between the positive terminal and negative terminal of the capacitor Cmid. In some embodiments, switching elements Q1-Q4, the inductor Lmid and the capacitor Cmid form a 4-switch buck-boost converter.

Depending on different applications and design needs, the non-isolated stage 103 may be configured as a step-up (buck) power converter or a step-down (boost) power converter. In some embodiments, when switching element Q3 is always on and switching element Q4 is always off, switching elements Q1-Q2, inductor Lmid and capacitor Cmid form a buck converter. The voltage across the capacitor Cmid is lower than the input voltage Vin. As a result, the non-isolated stage 103 enters a buck converter operation mode. The operation principles of a step-down or buck power converter are well known, and hence are not discussed in detail herein to avoid repetition.

On the other hand, when switching element Q1 is always on and switching element Q2 is always off, switching elements Q3-Q4, inductor Lmid and capacitor Cmid form a boost converter. The voltage across the capacitor Cmid is higher than the input voltage Vin. As a result, the non-isolated stage 103 enters a boost converter operation mode.

The operation principles of a step-up or boost power converter are well known, and hence are not discussed in detail herein.

According to some embodiments, switching elements Q1-Q4 are implemented as MOSFET or MOSFETs connected in parallel, any combinations thereof and/or the like. According to alternative embodiments, Q1, Q2, Q3 and Q4 may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

One advantageous feature of having the non-isolated stage 103 is that the non-isolated stage 103 helps the hybrid resonant converter 100 achieve a tight voltage regulation through adjusting the voltage Vmid. Since the regulation of the hybrid resonant converter 100 is obtained from the non-isolated stage 103, the LLC resonant converter 200 may operate at a fixed switching frequency such as the resonant frequency of the resonant tank 104. Such a fixed switching frequency helps the LLC resonant converter 200 achieve higher efficiency.

The switch network 102 includes four switching elements, namely Q5, Q6, Q7 and Q8. As shown in FIG. 2, a first pair of switching elements Q7 and Q8 are connected in series and further coupled between the positive terminal and negative terminal of the capacitor Cmid. A second pair of switching elements Q5 and Q6 are connected in series and further coupled between the positive terminal and negative terminal of the input dc power source 101.

The common node of the switching elements Q7 and Q8 is coupled to a first input terminal T1 of the resonant tank 104. Likewise, the common node of the switching elements Q5 and Q6 is coupled to a second input terminal T2 of the resonant tank 104.

The switching elements Q5, Q6, Q7 and Q8 form a primary side switching network of a full bridge resonant converter. According to some embodiments, switching elements Q5, Q6, Q7 and Q8 are implemented as MOSFET or MOSFETs connected in parallel, any combinations thereof and/or the like.

According to alternative embodiments, the primary switches (e.g., switch Q5) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter 200 shown in FIG. 2), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates four switches Q5, Q6, Q7 and Q8, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

It should further be noted that the voltage stress of the switches (e.g., Q1-Q8) is less than or equal to 60 V when the input voltage Vin is in a range from about 36 V to about 60 V. As a result, Q1, Q2, Q3, Q4, Q5, Q6, Q7 and Q8 can be implemented as MOSFETS having a voltage rating of 100 V.

FIG. 2 further illustrates the resonant tank 104 is coupled between the switch network 102 and the transformer 112. The resonant tank 104 is formed by a series resonant inductor Lr, a series resonant capacitor Cr and a parallel inductance Lm. As shown in FIG. 2, the series resonant inductor Lr and the series resonant capacitor Cr are connected in series and further coupled to the primary side of the transformer 112.

It should be noted while FIG. 2 shows the series resonant inductor Lr is an independent component, the series resonant inductor Lr may be replaced by the leakage inductance of the transformer 112. In other words, the leakage inductance (not shown) may function as the series resonant inductor Lr.

It should further be noted that the series resonant inductor Lr may be of a low Q. Such a low Q design helps the hybrid resonant converter 100 achieve high efficiency as well as high power density.

The transformer 112 may be of a primary winding and a single secondary winding. The primary winding is coupled to terminals T3 and T4 of the resonant tank 104 as shown in FIG. 2. The secondary winding is coupled to the load 111 through the rectifier 114, which is formed by switches S1, S2, S3 and S4. The rectifier 114 formed by switches S1, S2, S3 and S4 may be alternatively referred to as a synchronous rectifier 114 throughout the description.

It should be noted the transformer structure shown in FIG. 2 is merely an example. One person skilled in the art will recognize many alternatives, variations and modification. For example, the secondary side of the transformer 112 may be a center tapped winding. As a result, the secondary side may employ a synchronous rectifier formed by two switching elements. The operation principle of a synchronous rectifier coupled to a single secondary winding or a center tapped transformer secondary side is well known, and hence is not discussed in further detail herein.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

In some embodiments, the non-isolated stage 103 may function as a voltage regulation stage. The LLC resonant converter 200 may be an isolated and unregulated stage. In addition, the switches (e.g., Q5, Q6, Q7 and Q8) of the LLC resonant converter 200 may operate at a duty cycle of about 50%.

The LLC resonant converter 200 may operate at a frequency approximately equal to the resonant frequency of resonant tank 104. As a result, the primary switches (e.g., Q5, Q6, Q7 and Q8) may achieve zero voltage switching and the secondary switches (e.g., S1, S2, S3 and S4) may achieve zero voltage switching and/or zero current switching. By employing a suitable control mechanism, the switches (e.g., Q1, Q2, Q3 and Q4) of the non-isolated stage 103 may achieve zero voltage switching.

The voltage at the output of the hybrid resonant converter 100 is given by the following equation:

$$Vo = \frac{(Vin + Vmid) \cdot Ns}{2 \cdot Np} \quad (1)$$

where Np is the turns of the primary side winding of the transformer 112 and Ns is the turns of the secondary side winding of the transformer 112.

The voltage across the capacitor Cmid of the hybrid resonant converter 100 may vary based upon different operation modes. When the non-isolated stage 103 operates at a buck converter mode, the voltage at the capacitor Cmid of the hybrid resonant converter 100 is given by the following equation:

$$Vmid = D \cdot Vin \quad (2)$$

where D is the duty cycle of the switch Q1. D is in a range from 0 to 1. As a result, Vmid is lower than Vin. In other words, the voltage across the capacitor Cmid may be lower than the input voltage Vin when the not-isolated stage operates at a buck converter mode.

On the other hand, when the non-isolated stage 103 operates at a boost converter mode, the voltage across the capacitor Cmid of the hybrid resonant converter 100 is given by the following equation:

$$Vmid = \frac{1}{1-D} \cdot Vin \quad (3)$$

where D is the duty cycle of the switch Q4. D is in a range from 0 to 1. The voltage across the capacitor Cmid may be higher than the input voltage Vin.

In some embodiments, Vin is in a range from 36 V to 60 V. Vo is in a range from 34 V to 55 V. Np is equal to Ns. By employing the buck converter mode and the boost converter mode described above, the voltage across the capacitor Cmid of the hybrid resonant converter 100 is in a range from about 8 V to about 74 V.

Both the non-isolated stage 103 and the LLC resonant converter 200 may deliver power to the output of the hybrid resonant converter 100. A fraction of the power passes through both the non-isolated stage 103 and the LLC resonant converter 200. The rest of the power is delivered from the input dc power source 101 to the load through a single stage (the LLC resonant converter 200). The portion attributed to the non-isolated stage 103 may be defined as Ppwm. Ppwm is given by the following equation:

$$\frac{Ppwm}{Po} = \frac{Vmid}{Vin + Vmid} \quad (4)$$

where Po is the output power of the hybrid resonant converter 100.

One advantageous feature of the hybrid resonant converter 100 is that the switches Q1, Q2, Q3, Q4, Q5, Q6, Q7 and Q8 may achieve a zero voltage turn-on and secondary switches (e.g., S1, S2, S3 and S4) are of zero voltage switching and/or zero current switching. Such zero voltage switching and zero current switching help to reduce the total power losses of the hybrid resonant converter 100 shown in FIG. 2.

Figure 3:
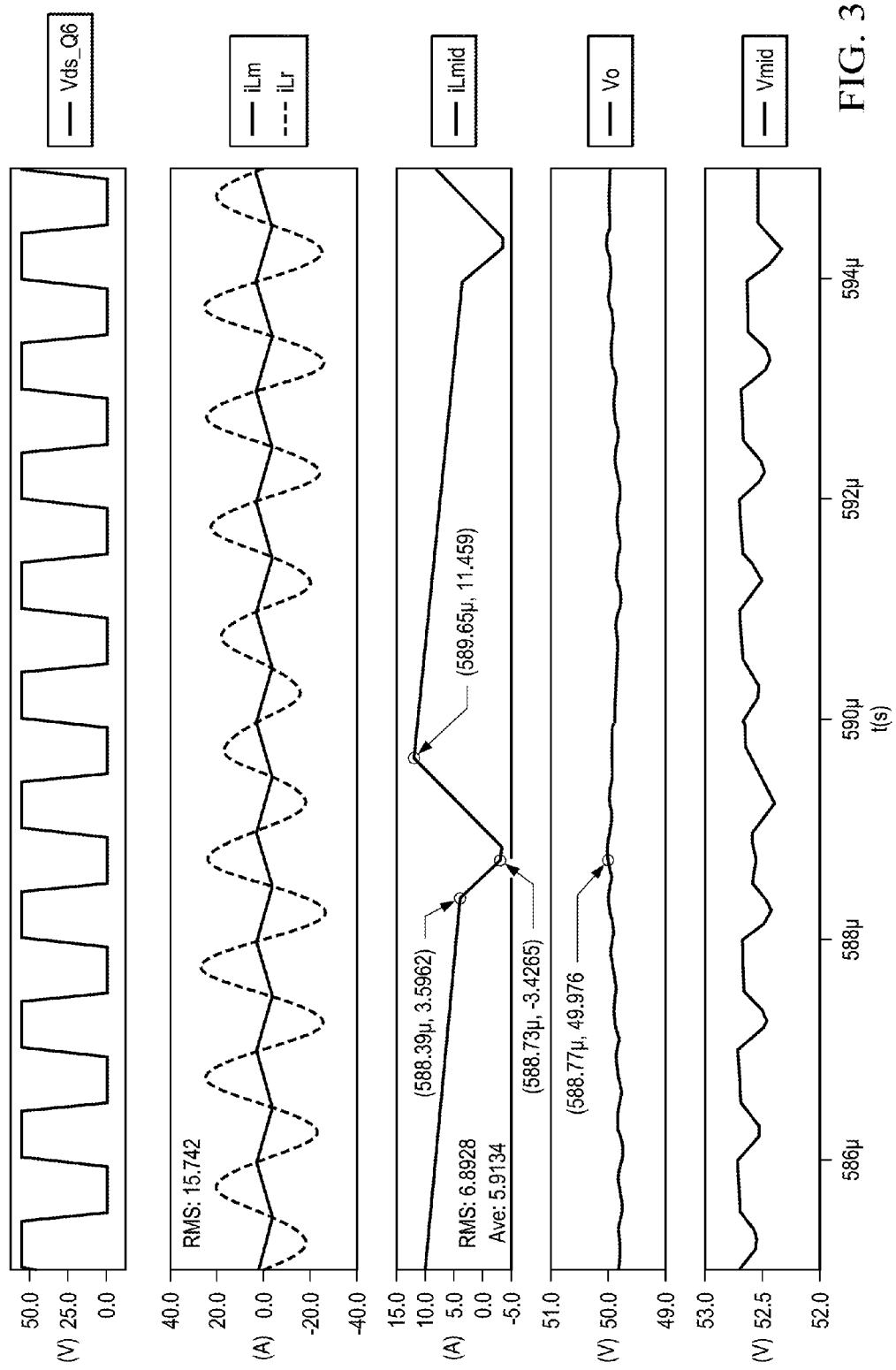
FIG. 3 illustrates a first group of switching waveforms of the hybrid resonant converter shown in FIG. 2 in accordance with various embodiments of the present disclosure.

FIG. 3 illustrates a first group of switching waveforms of the hybrid resonant converter shown in FIG. 2 in accordance with various embodiments of the present disclosure. The horizontal axis of FIG. 3 represents intervals of time. The unit of the horizontal axis is micro second. There may be five vertical axes. The first axis represents the drain-to-source voltage of Q6. The second vertical axis represents the currents flowing through the inductor Lr and the inductor Lm. The third vertical axis represents the current flowing through the inductor Lmid. The fourth vertical axis represents the voltage across the output of the hybrid resonant converter 100. The fifth vertical axis represents the voltage across the capacitor Cmid.

The waveforms are obtained based upon the following operating conditions. Lmid is equal to 2.5 uH; Cmid is equal to 100 uF; Co is equal to 30 uF; Np is equal to 6; Ns is equal to 6; Lm is equal to 4 uH; Lr is equal to 30 nH; Cr is equal to 700 nF.

In some embodiments, the input voltage Vin is in a range from 36 V to 60 V. The output voltage Vo is in a range from 34 V to 55 V. The full load power of the hybrid resonant converter 100 is equal to 600 W. The switching frequency of the LLC resonant converter 200 is about 1 MHz. The switching frequency of the buck-boost converter 103 is in a range from about 180 KHz to about 400 KHz.

As shown in FIG. 3, the root-mean-square (RMS) value of the current flowing through Lmid is equal to about 6.9 A. In contrast, the RMS value of the current flowing through Lr is equal to about 15.8 A. The voltage (Vmid) across the capacitor Cmid is about 52.5 V. The input voltage Vin is about 48 V. According to Equation (4) above, the non-isolated stage 103 delivers about 50% of the total power of the hybrid resonant converter 100.

The voltage waveform shown in the fifth row indicates the ripple voltage of the capacitor Cmid is relatively small when the capacitance of Cmid is equal to 100 uF. On the other hand, the voltage waveform shown in the fourth row indicates the ripple voltage of the capacitor Co is relatively small when the capacitance of Co is equal to 30 uF.

Figure 4:
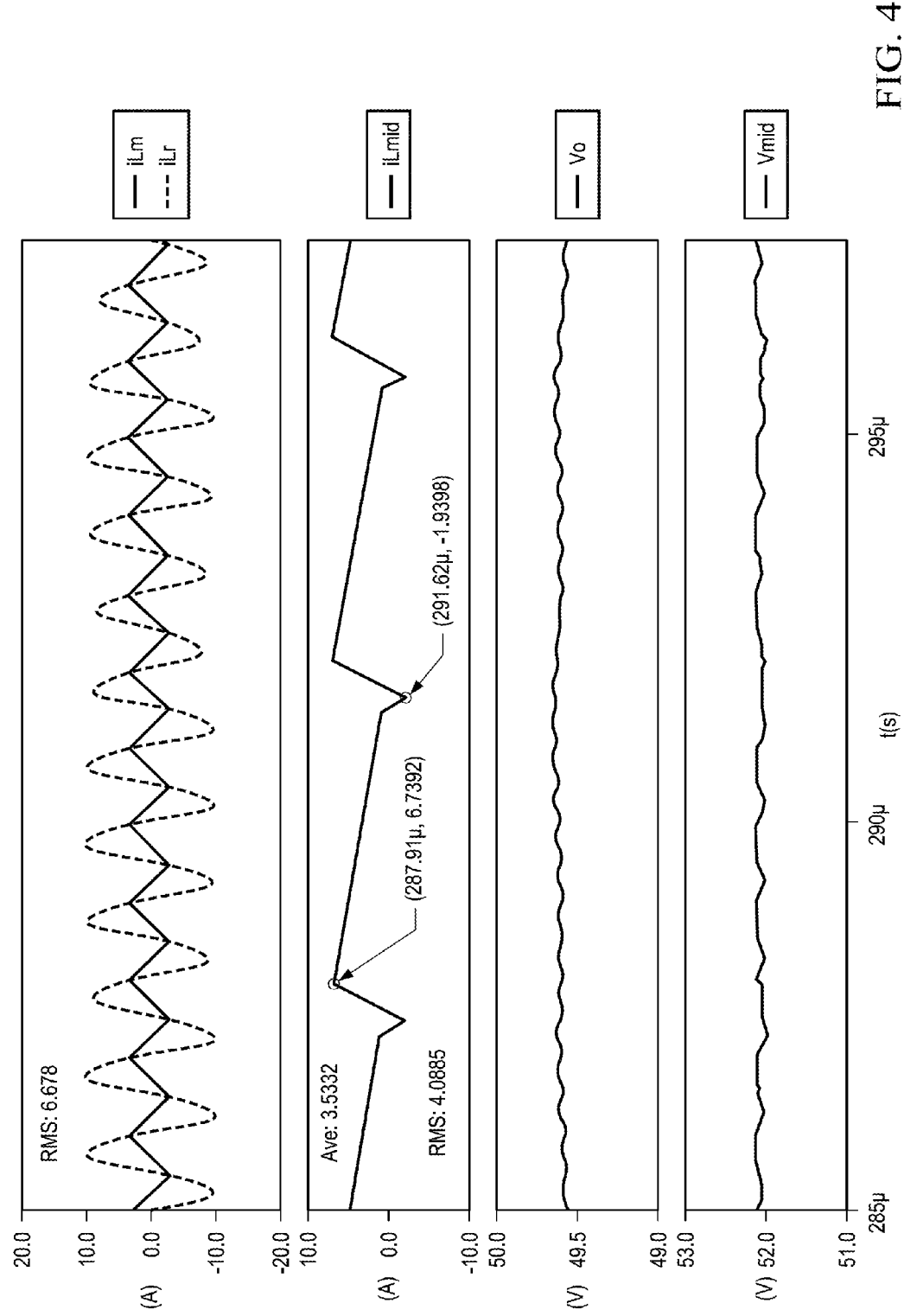
FIG. 4 illustrates a second group of switching waveforms of the hybrid resonant converter shown in FIG. 2 in accordance with various embodiments of the present disclosure.

FIG. 4 illustrates a second group of switching waveforms of the hybrid resonant converter shown in FIG. 2 in accordance with various embodiments of the present disclosure. The operating conditions of FIG. 4 are similar to those of FIG. 3 except that the hybrid resonant converter 100 operates at 50 percent full load. As shown in FIG. 4, the RMS value of the current flowing through Lmid (second row of FIG. 4) is equal to about 4.1 A. In contrast, the RMS value of the current flowing through Lr (first row of FIG. 4) is equal to about 6.8 A. The voltage (Vmid) across Cmid is about 52 V. The input voltage Vin is about 48 V. According to Equation (4) above, the non-isolated stage 103 delivers about 50% of the total power of the hybrid resonant converter 100.

The voltage waveform shown in the fourth row of FIG. 4 indicates the ripple voltage of the capacitor Cmid is relatively small when the capacitance of Cmid is equal to 100 uF. On the other hand, the voltage waveform shown in the third row of FIG. 4 indicates the ripple voltage of the capacitor Co is relatively small when the capacitance of Co is equal to 30 uF.

Figure 5:
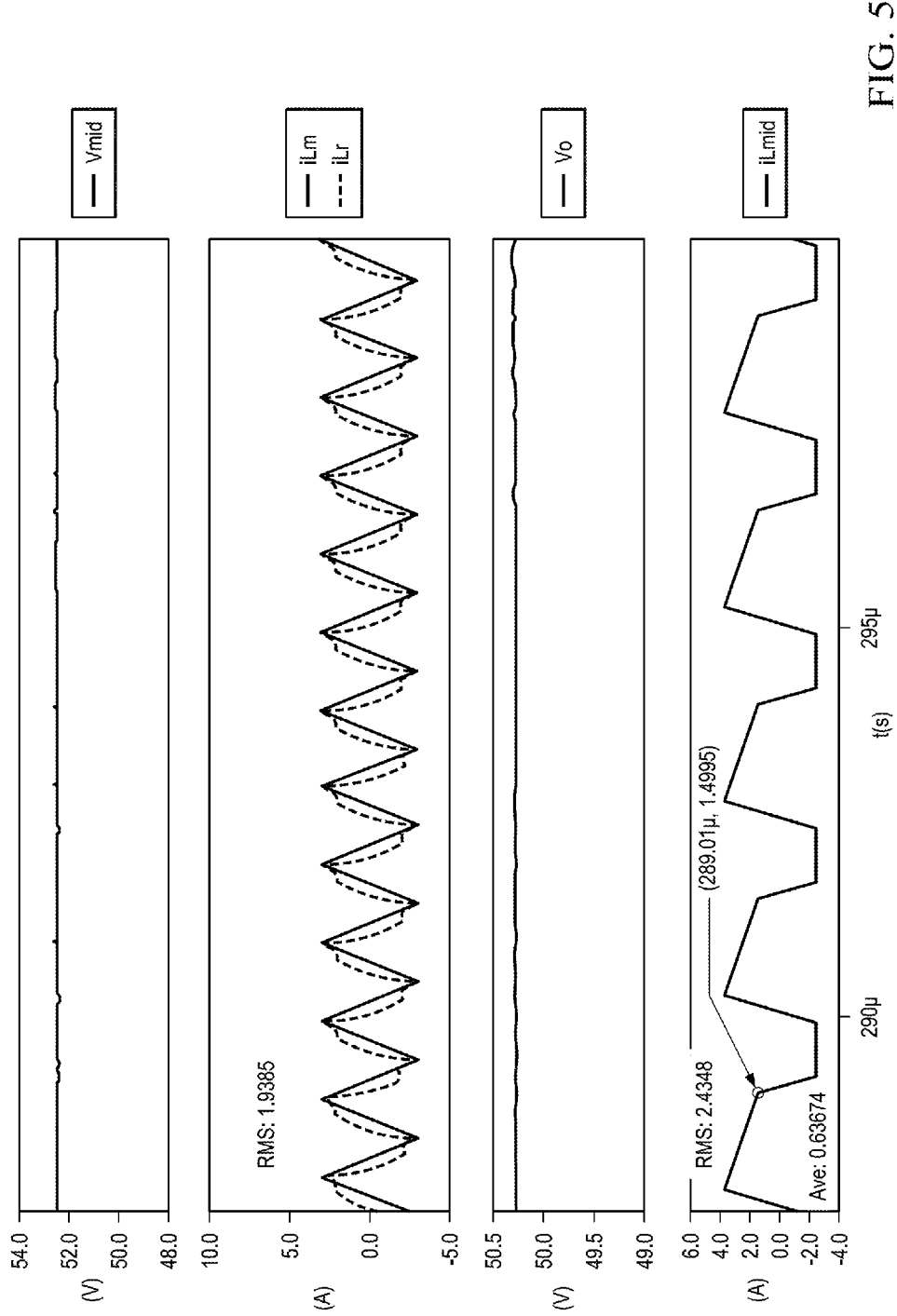
FIG. 5 illustrates a third group of switching waveforms of the hybrid resonant converter shown in FIG. 2 in accordance with various embodiments of the present disclosure.

FIG. 5 illustrates a third group of switching waveforms of the hybrid resonant converter shown in FIG. 2 in accordance with various embodiments of the present disclosure. The operating conditions of FIG. 5 are similar to those of FIG. 3 except that the hybrid resonant converter 100 operates at 10 percent full load. As shown in FIG. 5, the RMS value of the current flowing through Lmid (fourth row of FIG. 5) is equal to about 2.4 A. In contrast, the RMS value of the current flowing through Lr is equal to about 1.9 A. The voltage (Vmid) across Cmid is about 52 V. The input voltage Vin is about 48 V. According to Equation (4) above, the non-isolated stage 103 delivers about 50% of the total power of the hybrid resonant converter 100.

The voltage waveform shown in the fourth row of FIG. 5 indicates the ripple voltage of the capacitor Cmid is relatively small when the capacitance of Cmid is equal to 100 uF. On the other hand, the voltage waveform shown in the third row of FIG. 5 indicates the ripple voltage of the capacitor Co is relatively small when the capacitance of Co is equal to 30 uF.

Figure 6:
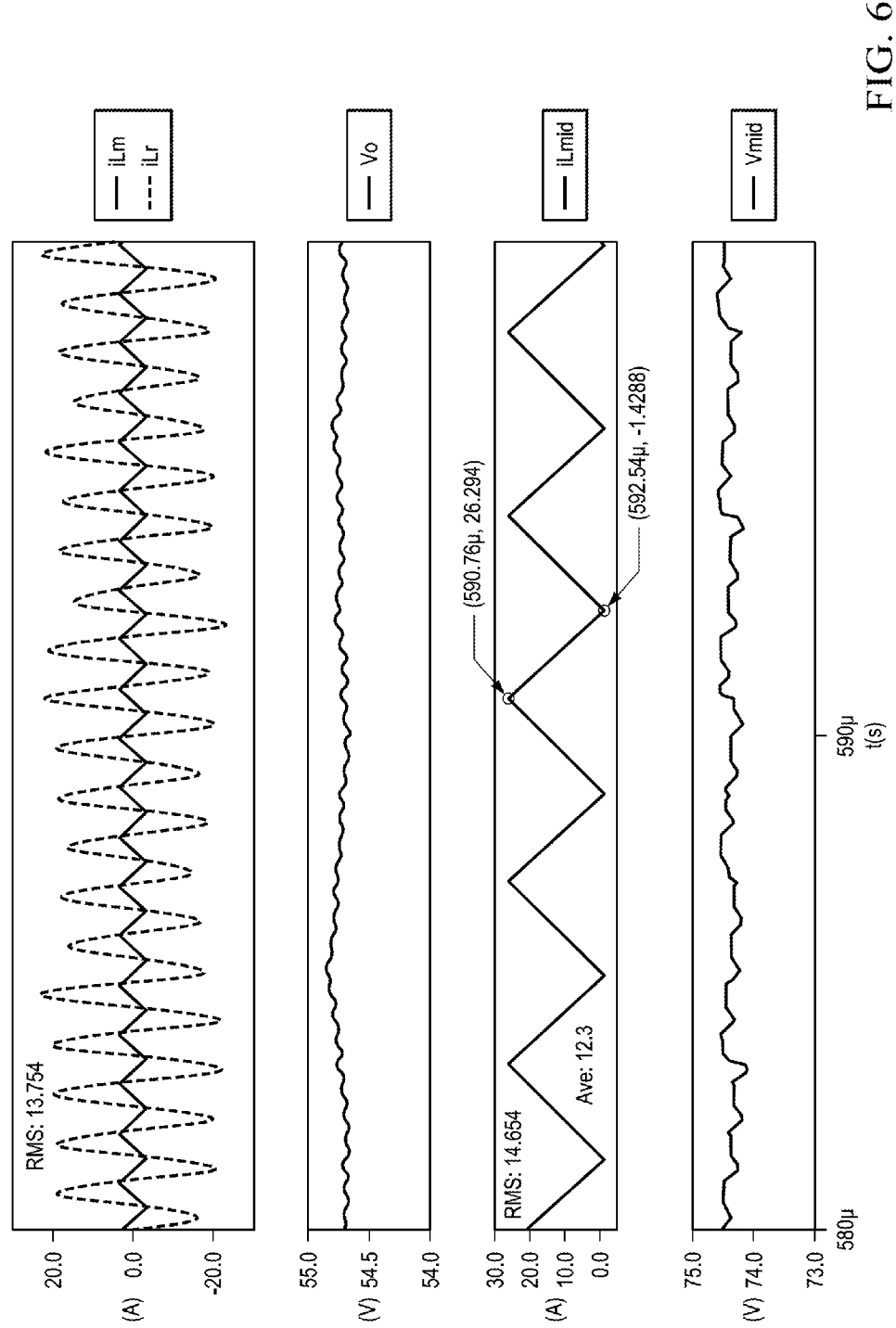
FIG. 6 illustrates a fourth group of switching waveforms of the hybrid resonant converter shown in FIG. 2 in accordance with various embodiments of the present disclosure.

FIG. 6 illustrates a fourth group of switching waveforms of the hybrid resonant converter shown in FIG. 2 in accordance with various embodiments of the present disclosure. The operating conditions of FIG. 6 are similar to those of FIG. 3 except that the input of the hybrid resonant converter 100 is about 36 V and the output of the hybrid resonant converter 100 is about 55 V. As shown in FIG. 6, the output voltage is higher than the input voltage. As a result, the non-isolated stage 103 operates at a boost converter mode. FIG. 6 shows the voltage across the capacitor Cmid is about 74 V.

As shown in FIG. 6, the RMS value of the current flowing through Lmid is equal to about 14.6 A. In contrast, the RMS value of the current flowing through Lr is equal to about 13.8 A. The voltage (Vmid) across Cmid is about 74 V. The input voltage Vin is about 36 V. According to Equation (4) above, the non-isolated stage 103 delivers about 67% of the total power of the hybrid resonant converter 100.

Figure 7:
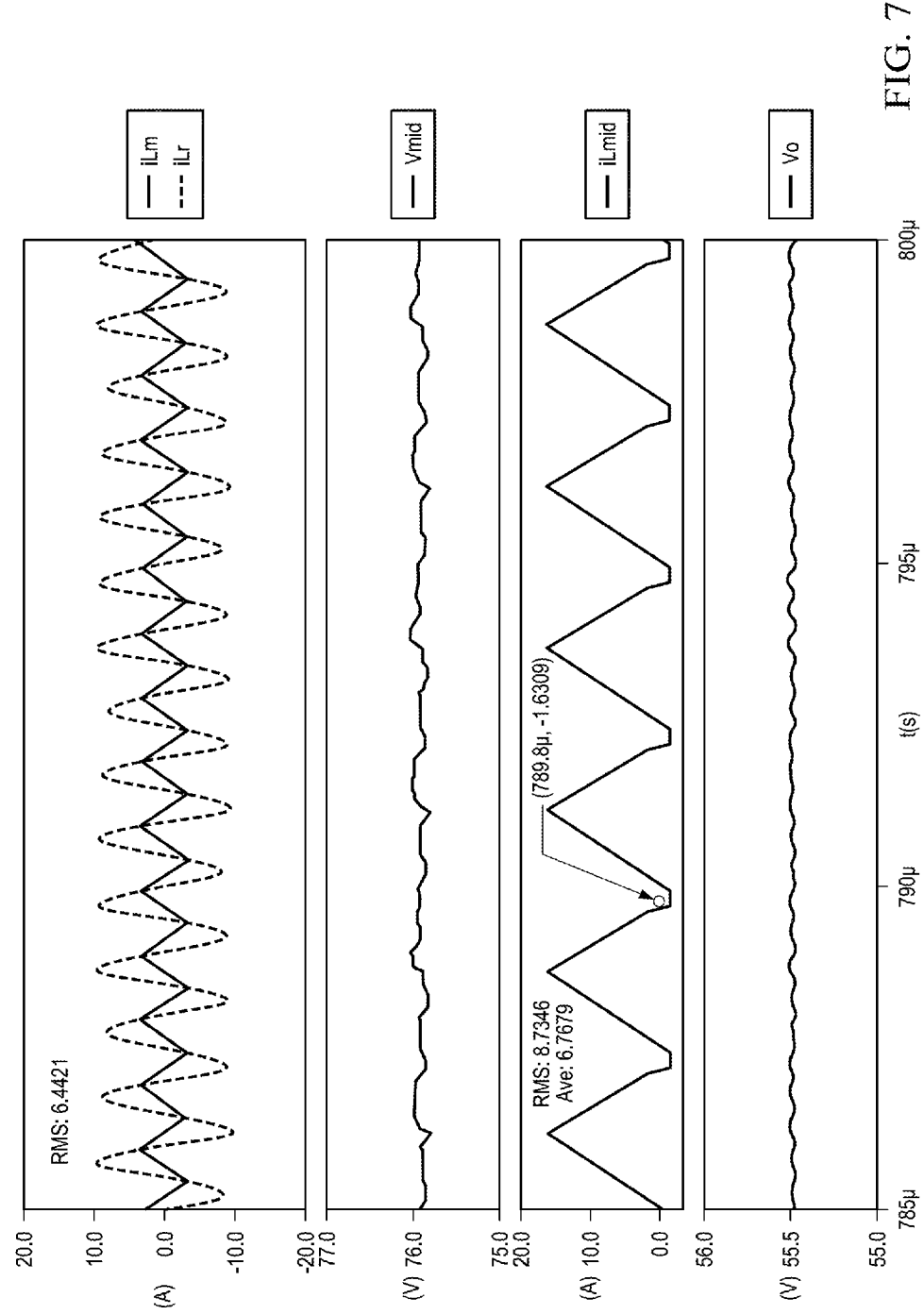
FIG. 7 illustrates a fifth group of switching waveforms of the hybrid resonant converter shown in FIG. 2 in accordance with various embodiments of the present disclosure.

FIG. 7 illustrates a fifth group of switching waveforms of the hybrid resonant converter shown in FIG. 2 in accordance with various embodiments of the present disclosure. The operating conditions of FIG. 7 are similar to those of FIG. 6 except that the hybrid resonant converter 100 operates at 50 percent full load. As shown in FIG. 7, the RMS value of the current flowing through Lmid is equal to about 8.7 A. In contrast, the RMS value of the current flowing through Lr is equal to about 6.4 A. The voltage (Vmid) across the capacitor Cmid is about 74 V. The input voltage Vin is about 36 V. According to Equation (4) above, the non-isolated stage 103 delivers about 67% of the total power of the hybrid resonant converter 100.

Figure 8:
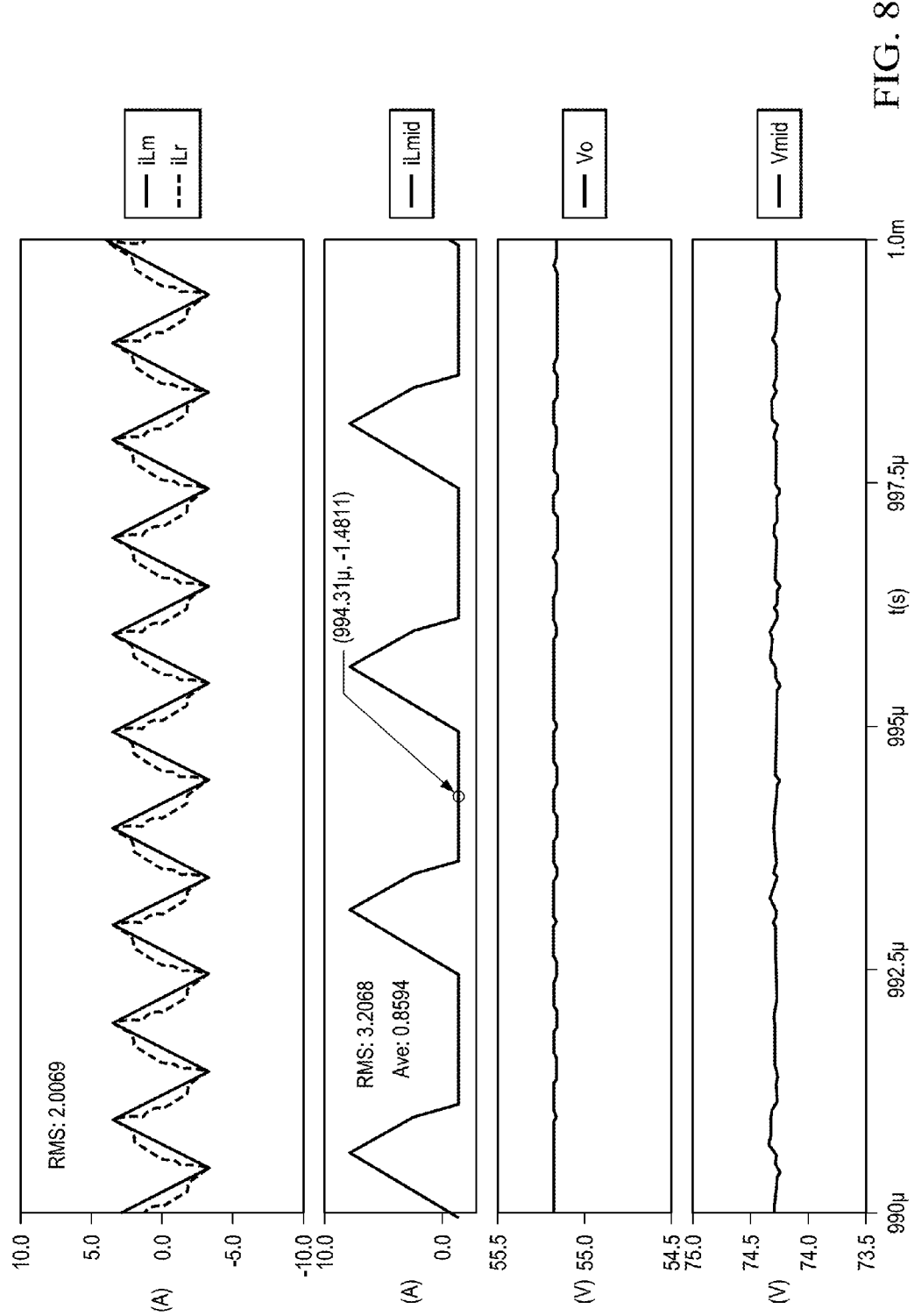
FIG. 8 illustrates a sixth group of switching waveforms of the hybrid resonant converter shown in FIG. 2 in accordance with various embodiments of the present disclosure.

FIG. 8 illustrates a sixth group of switching waveforms of the hybrid resonant converter shown in FIG. 2 in accordance with various embodiments of the present disclosure. The operating conditions of FIG. 8 are similar to those of FIG. 6 except that the hybrid resonant converter 100 operates at 10 percent full load. As shown in FIG. 8, the RMS value of the current flowing through Lmid is equal to about 3.2 A. In contrast, the RMS value of the current flowing through Lr is equal to about 2.0 A. The voltage (Vmid) across the capacitor Cmid is about 74 V. The input voltage Vin is about 36 V. According to Equation (4) above, the non-isolated stage 103 delivers about 67% of the total power of the hybrid resonant converter 100.

Figure 9:
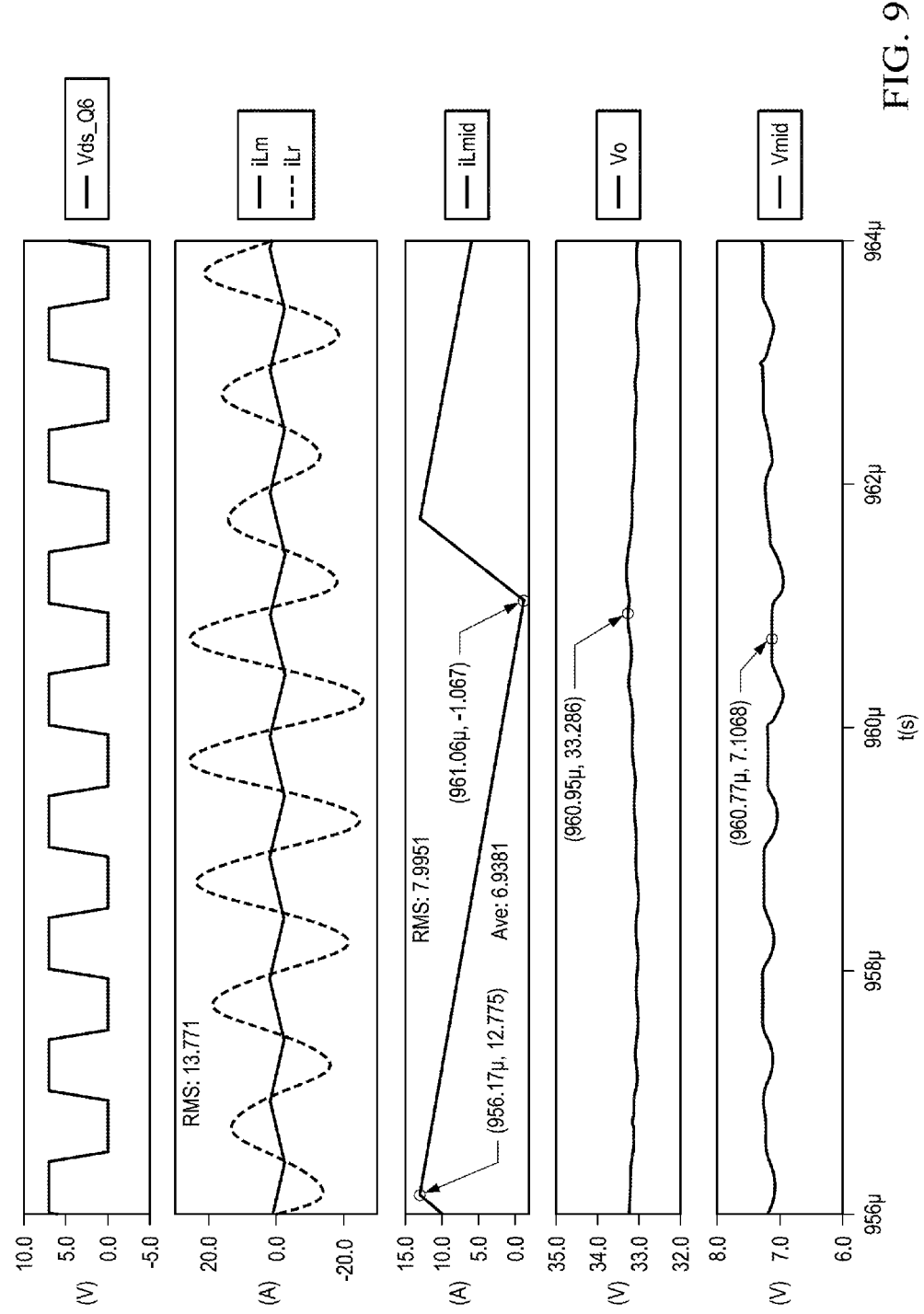
FIG. 9 illustrates a seventh group of switching waveforms of the hybrid resonant converter shown in FIG. 2 in accordance with various embodiments of the present disclosure.

FIG. 9 illustrates a seventh group of switching waveforms of the hybrid resonant converter shown in FIG. 2 in accordance with various embodiments of the present disclosure. The operating conditions of FIG. 9 are similar to those of FIG. 3 except that the input of the hybrid resonant converter 100 is about 60 V and the output voltage of the hybrid resonant converter 100 is about 34 V. As shown in FIG. 9, the input voltage is higher than the output voltage. As a result, the non-isolated stage 103 operates at a buck converter mode.

As shown in FIG. 9, the RMS value of the current flowing through Lmid is equal to about 8 A. In contrast, the RMS value of the current flowing through Lr is equal to about 13.8 A. The voltage (Vmid) across the capacitor Cmid is about 7 V. The input voltage Vin is about 60 V. According to Equation (4) above, the non-isolated stage 103 delivers about 10% of the total power of the hybrid resonant converter 100.

Figure 10:
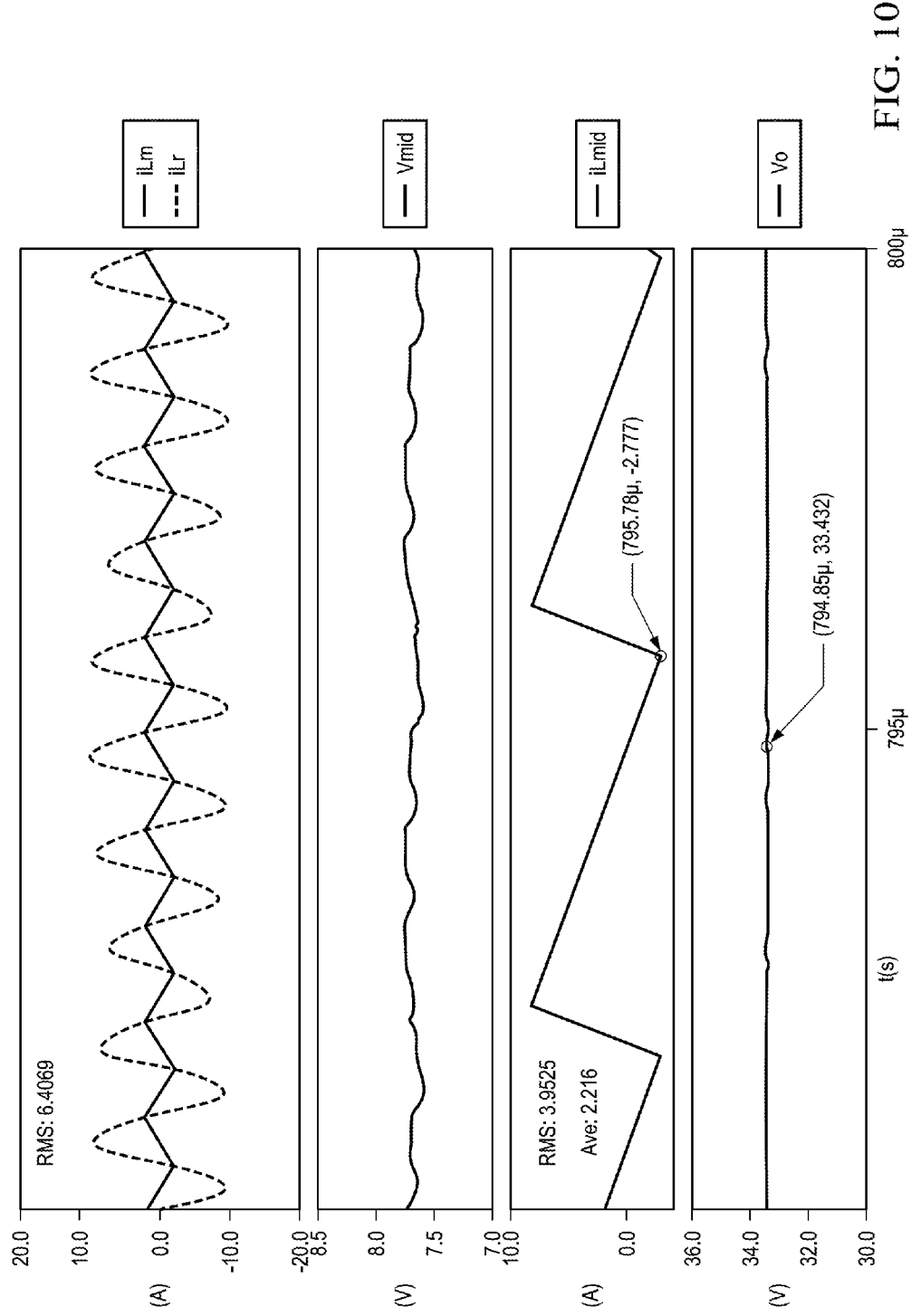
FIG. 10 illustrates an eighth group of switching waveforms of the hybrid resonant converter shown in FIG. 2 in accordance with various embodiments of the present disclosure.

FIG. 10 illustrates an eighth group of switching waveforms of the hybrid resonant converter shown in FIG. 2 in accordance with various embodiments of the present disclosure. The operating conditions of FIG. 10 are similar to those of FIG. 9 except that the hybrid resonant converter 100 operates at 50 percent full load. As shown in FIG. 10, the RMS value of the current flowing through Lmid is equal to about 3.9 A. In contrast, the RMS value of the current flowing through Lr is equal to about 6.4 A. The voltage (Vmid) across the capacitor Cmid is about 7 V. The input voltage Vin is about 60 V. According to Equation (4) above, the non-isolated stage 103 delivers about 10% of the total power of the hybrid resonant converter 100.

Figure 11:
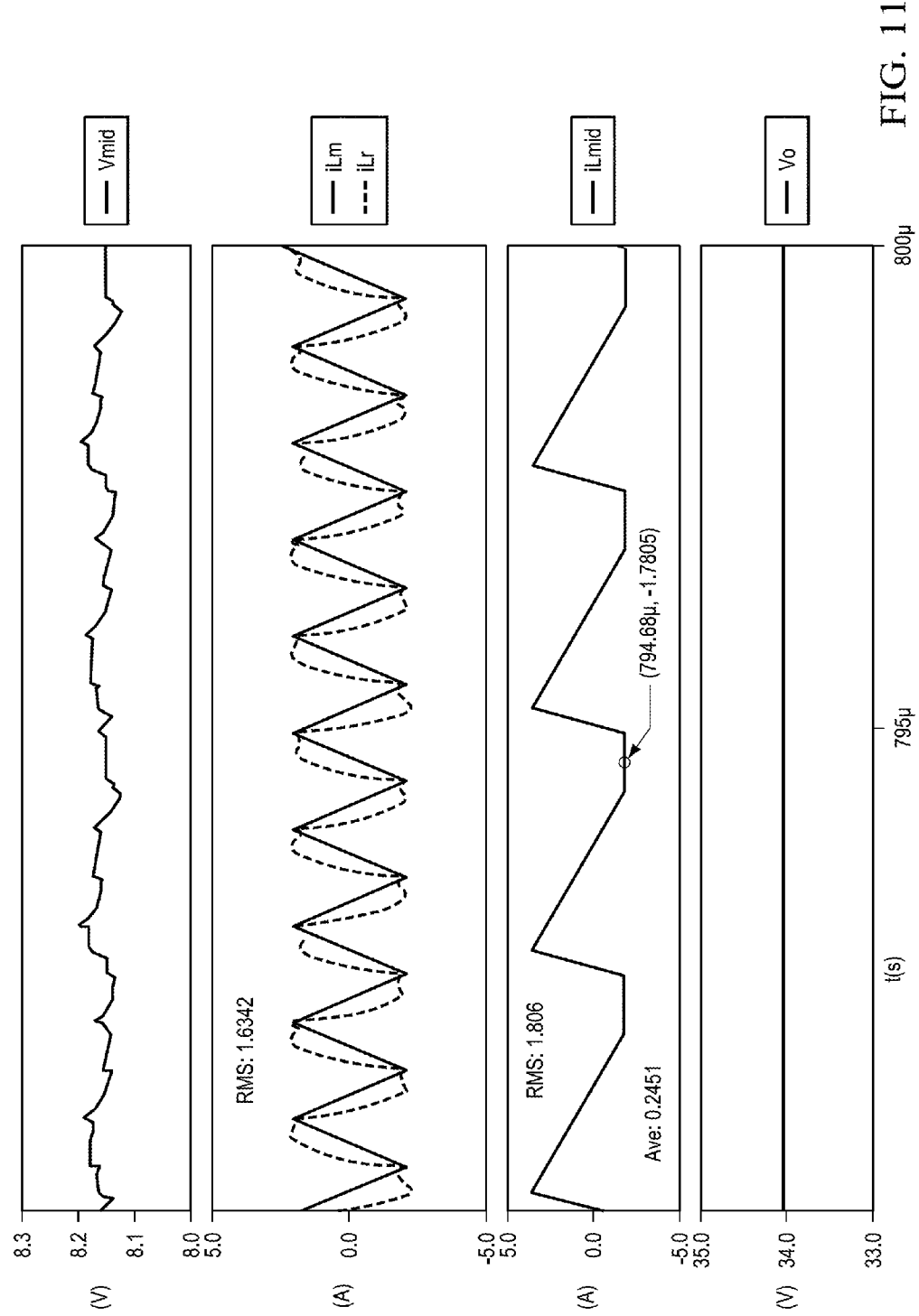
FIG. 11 illustrates a ninth group of switching waveforms of the hybrid resonant converter shown in FIG. 2 in accordance with various embodiments of the present disclosure.

FIG. 11 illustrates a ninth group of switching waveforms of the hybrid resonant converter shown in FIG. 2 in accordance with various embodiments of the present disclosure. The operating conditions of FIG. 11 are similar to those of FIG. 9 except that the hybrid resonant converter 100 operates at 10 percent full load. As shown in FIG. 11, the RMS value of the current flowing through Lmid is equal to about 1.8 A. In contrast, the RMS value of the current flowing through Lr is equal to about 1.64 A. The voltage (Vmid) across the capacitor Cmid is about 8 V. The input voltage Vin is about 60 V. According to Equation (4) above, the non-isolated stage 103 delivers about 10% of the total power of the hybrid resonant converter 100.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
a non-isolated stage having an input terminal and an output terminal, the input terminal directly connected to an input dc power source to receive an input voltage, wherein the non-isolated stage is configured to operate at a buck converter mode in response to a first input voltage and operate at a boost converter mode in response to a second input voltage; and
a resonant stage coupled to the non-isolated stage, the resonant stage having a first input terminal and a second input terminal, the first input terminal directly connected to the input dc power source to receive an input voltage, the second input terminal connected to the output terminal of the non-isolated stage to receive another input voltage from the non-isolated stage, wherein the resonant stage is configured to operate at a resonant mode.

2. The converter of claim 1, wherein:
the non-isolated stage is a four-switch buck-boost converter; and
the resonant stage is an inductor-inductor-capacitor (LLC) resonant converter.

3. The converter of claim 1, wherein:
the resonant stage is configured to operate at a fixed frequency; and
the non-isolated stage is configured to operate as a PWM converter.

4. The converter of claim 3, wherein:
the fixed frequency is about 1 MHz; and
a switching frequency of the PWM mode is in a range from about 180 KHz to about 400 KHz.

5. The converter of claim 1, wherein the converter further comprises a capacitor coupled between the non-isolated stage and the resonant stage, and wherein an output voltage of the resonant stage is proportional to a sum of a voltage of the input dc power source and a voltage across the capacitor divided by two.

6. The converter of claim 1, wherein:
the non-isolated stage comprises a first switch, a second switch, a third switch, a fourth switch and an inductor.

7. The converter of claim 6, wherein:
the first switch and the second switch are connected in series and further coupled between two terminals of the input dc power source;
the third switch and the fourth switch are connected in series and further coupled between two terminals of a capacitor in the converter; and
the inductor is between a common node of the first switch and the second switch, and a common node of the third switch and the fourth switch.

8. The converter of claim 1, wherein:
the resonant stage comprises four primary switches, and wherein:
a first primary switch and a second primary switch are connected in series and further coupled between two terminals of a capacitor in the converter; and
a third switch and a fourth switch are connected in series and further coupled between two terminals of the input dc power source.

9. The converter of claim 1, wherein:
the resonant stage comprises a primary switch network, a resonant tank, an isolation transformer, a secondary side switch network and an output capacitor, and wherein:
the primary switch network, the resonant tank, the isolation transformer, the secondary side switch network and the output capacitor are connected in cascade.

10. A system comprising:
a non-isolated stage coupled between an input dc power source and a capacitor, wherein
the non-isolated stage is configured to operate at a buck converter mode when an input voltage from the input dc power source is higher than a voltage threshold, and wherein
the non-isolated stage is configured to operate at a boost converter mode when the input voltage from the input dc power source is lower than the voltage threshold; and a resonant stage coupled to the non-isolated stage, wherein,
the resonant stage is configured to operate at a resonant mode, and wherein
the resonant stage has a first input terminal coupled to the capacitor and a second input terminal coupled to the input dc power source directly without through the non-isolated stage.

11. The system of claim 10, wherein:
the resonant stage is an isolated and unregulated power converter.

12. The system of claim 11, wherein:
the unregulated power converter is an inductor-inductor-capacitor (LLC) resonant converter, and wherein the LLC resonant converter is configured to:
operate in a 50% duty cycle; and
operate at a fixed frequency.

13. The system of claim 10, wherein:
the non-isolated stage is a regulated dc/dc converter.

14. The system of claim 10, wherein:
the non-isolated stage comprises a first switch, a second switch, a third switch, a fourth switch and an inductor,
the first switch and the second switch connected in series and further coupled between two terminals of the input dc power source,
the third switch and the fourth switch connected in series and further coupled between two terminals of the capacitor, and the inductor configured between a common node of the first switch and the second switch, and a common node of the third switch and the fourth switch, wherein
the resonant stage comprises a primary switch network, a resonant tank, an isolation transformer, a secondary side switch network and an output capacitor,
the primary switch network, the resonant tank, the isolation transformer, the secondary side switch network and the output capacitor connected in cascade, and wherein
the primary switch network comprises four primary switches including a first primary switch, a second primary switch, a third primary switch and a fourth primary switch,
the first primary switch and the second primary switch connected in series and further coupled between the two terminals of the capacitor, and
the third primary switch and the fourth primary switch connected in series and further coupled between the two terminals of the input dc power source.

15. The system of claim 14, wherein:
a power delivered by the non-isolated stage is a fraction of a power delivered by the resonant stage.

16. A method comprising:
detecting an input voltage from an input dc power source coupled to a hybrid resonant converter, wherein the hybrid resonant converter comprises:
a non-isolated stage coupled between the input dc power source and a capacitor, wherein
the non-isolated stage is configured to operate at a PWM mode; and
a resonant stage having a first input terminal coupled to the capacitor and a second input terminal coupled to the input dc power source directly, wherein the resonant stage is configured to operate at a resonant mode;
configuring the non-isolated stage to operate at a buck converter when the input voltage is higher than a threshold; and configuring the non-isolated stage to operate at a boost converter mode when the input voltage is lower than the threshold.

17. The method of claim 16, further comprising:
configuring the resonant stage to operate at a fixed switching frequency, wherein the resonant stage is an inductor-inductor-capacitor (LLC) resonant converter.

18. The method of claim 16, wherein:
the non-isolated stage is a four-switch buck-boost power converter; and
the resonant stage is an isolated and unregulated power converter.

19. The method of claim 16, further comprising:
configuring the non-isolated stage to operate as a regulated power converter; and
configuring the resonant stage to operate as an unregulated power converter.

* * * * *